(12) United States Patent
Nakamura et al.

(10) Patent No.: US 12,810,254 B2
(45) Date of Patent: Nov. 24, 2026

(54) INFORMATION PROCESSING APPARATUS, HEAD MANAGEMENT METHOD, AND HEAD MANAGEMENT SYSTEM

(71) Applicant: SEIKO EPSON CORPORATION, Tokyo (JP)

(72) Inventors: Yuki Nakamura, Matsumoto (JP); Katsuaki Sato, Matsumoto (JP); Kenya Sakurai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 460 days.

(21) Appl. No.: 18/321,918

(22) Filed: May 23, 2023

(65) Prior Publication Data

US 2023/0385781 A1 Nov. 30, 2023

(30) Foreign Application Priority Data

May 24, 2022 (JP) ................................ 2022-084335

(51) Int. Cl.
*G06Q 10/20* (2023.01)
*G06Q 10/083* (2024.01)
*H04N 1/00* (2006.01)

(52) U.S. Cl.
CPC ......... *G06Q 10/20* (2013.01); *G06Q 10/0838* (2013.01); *H04N 1/00344* (2013.01); *H04N 2201/0082* (2013.01)

(58) Field of Classification Search
CPC ............... G06Q 10/20; G06Q 10/0838; H04N 1/00344; H04N 2201/0082
(Continued)

(56) References Cited

U.S. PATENT DOCUMENTS 11,397,398 B2 7/2022 Otsuka et al.
2003/0009383 A1* 1/2003 Mori ................... G06Q 20/203 705/22

(Continued)

FOREIGN PATENT DOCUMENTS

CN 110888608 3/2020
JP 2012128237 7/2012

(Continued)

OTHER PUBLICATIONS

A. G. Kravets, N. Y. Orudjev and N. A. Salnikova, "Software for Predictive Maintenance and Repair of the Enterprise Office Equipment," 2019 International Multi-Conference on Industrial Engineering and Modern Technologies (FarEastCon), Vladivostok, Russia, 2019, pp. 1-7, doi: 10.1109/FarEastCon.2019.8 (Year: 2019).*

*Primary Examiner* — Wenren Chen
(74) *Attorney, Agent, or Firm* — WORKMAN NYDEGGER

(57) ABSTRACT

A server is an information processing apparatus that is connected to a printer and manages delivery of a printing head replaceable with a printing head attached to the printer, the information processing apparatus including a replacement-information acquiring unit configured to acquire, from the printer, replacement information indicating that the printing head attached to the printer was replaced with the delivered printing head and a replacement processor configured to instruct delivery of a new printing head when the replacement-information acquiring unit acquires the replacement information.

8 Claims, 6 Drawing Sheets

(58) Field of Classification Search
USPC .......................................................... 705/305
See application file for complete search history.

(56) References Cited

U.S. PATENT DOCUMENTS

| | | | |
|---|---|---|---|
| 2005/0074246 A1 | 4/2005 | Hayward et al. | |
| 2012/0148267 A1 | 6/2012 | Kawai | |
| 2016/0288515 A1* | 10/2016 | Matsuda | B41J 2/17543 |
| 2020/0001636 A1* | 1/2020 | Rosenau | G07B 17/00362 |
| 2020/0079097 A1* | 3/2020 | Otsuka | H04N 1/4413 |
| 2021/0302872 A1* | 9/2021 | Suzuki | G03G 21/1878 |
| 2021/0354488 A1 | 11/2021 | Nakamura | |
| 2023/0018544 A1* | 1/2023 | Yamamoto | H04N 1/00 |
| 2024/0295998 A1* | 9/2024 | Tani | G03G 15/5079 |

FOREIGN PATENT DOCUMENTS

| | | |
|---|---|---|
| JP | 2021181182 | 11/2021 |
| JP | 2021-185456 A | 12/2021 |

* cited by examiner

INFORMATION PROCESSING APPARATUS, HEAD MANAGEMENT METHOD, AND HEAD MANAGEMENT SYSTEM

The present application is based on, and claims priority from JP Application Serial Number 2022-084335, filed May 24, 2022, the disclosure of which is hereby incorporated by reference herein in its entirety.

BACKGROUND

1. Technical Field

The present disclosure relates to an information processing apparatus, a head management method, and a head management system.

2. Related Art

There has been known a system that automatically orders expendables of a printer or the like as described in JP-A-2021-185456 (Patent Literature 1). In the system described in Patent Literature 1, a computer that monitors a state of the printer is connected to an order server via a network. When a residual amount of a recording agent of the printer decreases to less than a predetermined value, the computer transmits a mail for automatic order to the order server. When the order server receives the mail and performs a procedure for ordering the recording agent, the recording agent is delivered to a user. Therefore, the user can acquire a recording agent for replacement before the residual amount of the recording agent runs out and the printer becomes unable to be used.

However, in the system that delivers a component for replacement according to, for example, a failure of the printer, it is difficult to detect, beforehand, a period when a component should be replaced and the delivery is performed according to an order from the user. Therefore, if the order is performed at timing when replacement is necessary because of a failure or the like, there is a period in which the printer cannot be used until a component is delivered.

SUMMARY

An information processing apparatus is an information processing apparatus that is connected to an image forming apparatus and manages delivery of a second head and a third head replaceable with a first head attached to the image forming apparatus, the information processing apparatus including: a replacement-information acquiring unit configured to acquire, from the image forming apparatus, replacement information indicating that the first head was replaced with the second head; and a replacement processing unit configured to instruct the delivery of the third head when the replacement-information acquiring unit acquires the replacement information.

A head management method is a head management method for managing delivery of a second head and a third head replaceable with a first head attached to an image forming apparatus, the head management method including: acquiring, from the image forming apparatus, replacement information indicating that the first head was replaced with the second head; and instructing the delivery of the third head when the replacement information is acquired.

A head management system is a head management system including: an image forming apparatus; and an information processing apparatus that is connected to the image forming apparatus and manages delivery of a second head and a third head replaceable with a first head attached to the image forming apparatus, the information processing apparatus including: a replacement-information acquiring unit configured to acquire, from the image forming apparatus, replacement information indicating that the first head was replaced with the second head; and a replacement processing unit configured to instruct the delivery of the third head when the replacement-information acquiring unit acquires the replacement information.

DESCRIPTION OF EXEMPLARY EMBODIMENTS

A head management system according to an embodiment is explained below with reference to the drawings.

Figure 1:
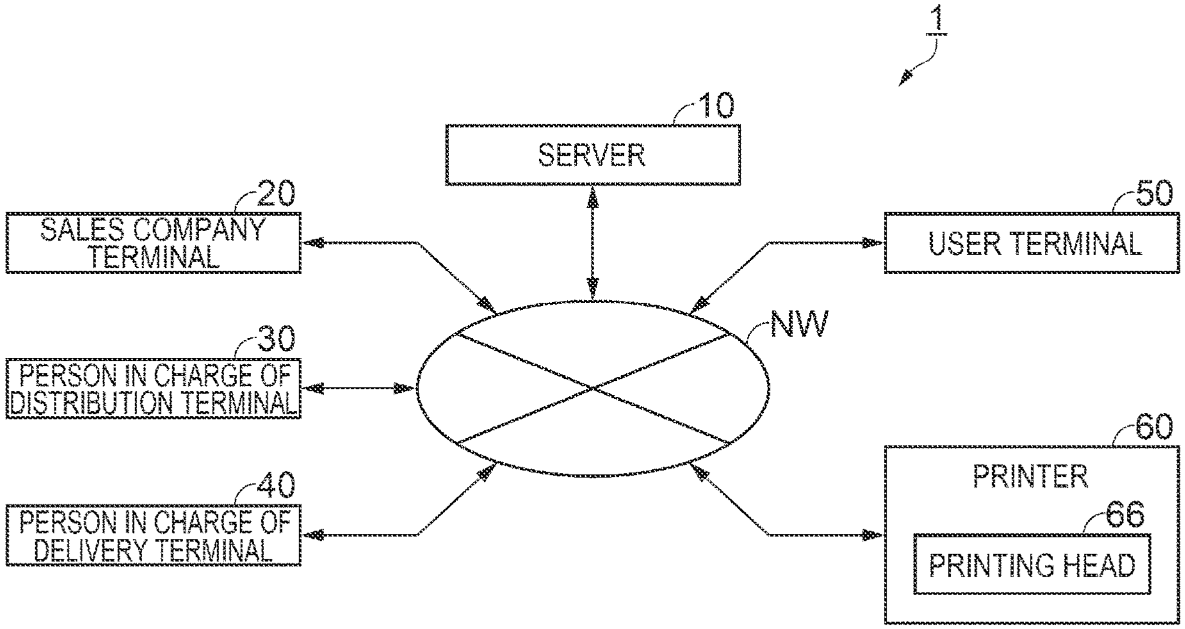
FIG. 1 is a configuration diagram showing an example of a schematic configuration of a head management system.

FIG. 1 is a configuration diagram showing an example of a schematic configuration of a head management system 1 in this embodiment.

As shown in FIG. 1, the head management system 1 includes a server 10, a sales company terminal 20, a person in charge of distribution terminal 30, a person in charge of delivery terminal 40, a user terminal 50, and a printer 60, which are connected to one another via a network NW such as the Internet. The printer 60 includes a replaceable printing head 66. The server 10 manages delivery of the printing head 66 for replacement and collection of the printing head 66 detached by replacement.

The sales company terminal 20 is a terminal device managed by a sales company that sells the printer 60 and the printing head 66 and is operated by a person in charge of sales who is in charge of the sales of the printer 60 and the printing head 66. In this embodiment, the person in charge of sales is also in charge of management of delivery and collection of the printing head 66. The person in charge of distribution terminal 30 is a terminal device provided in a distribution base where stocks of printing heads 66 are kept. The person in charge of distribution terminal 30 is operated by a person in charge of distribution who manages the stocks of the printing heads 66. The person in charge of delivery terminal 40 is a terminal device operated by a person in charge of delivery of a delivery company. When the printing head 66 is delivered from the distribution base to a user, the person in charge of delivery terminal 40 is carried by the person in charge of delivery. The user terminal 50 is a terminal device operated by a user who manages the printer 60. The sales company terminal 20, the person in charge of distribution terminal 30, the person in charge of delivery terminal 40, and the user terminal 50 are hereinafter respectively referred to as terminal devices 20, 30, 40, and 50 as well. The server 10 is an information processing apparatus that is the core of the head management system 1. The server 10 receives input of information from the terminal devices 20 to 50 and the printer 60 and performs processing corresponding to the information. For example, the server 10 notifies various kinds of information to the terminal devices 20 to 50.

The units of the head management system 1 are explained in detail below.

Figure 2:
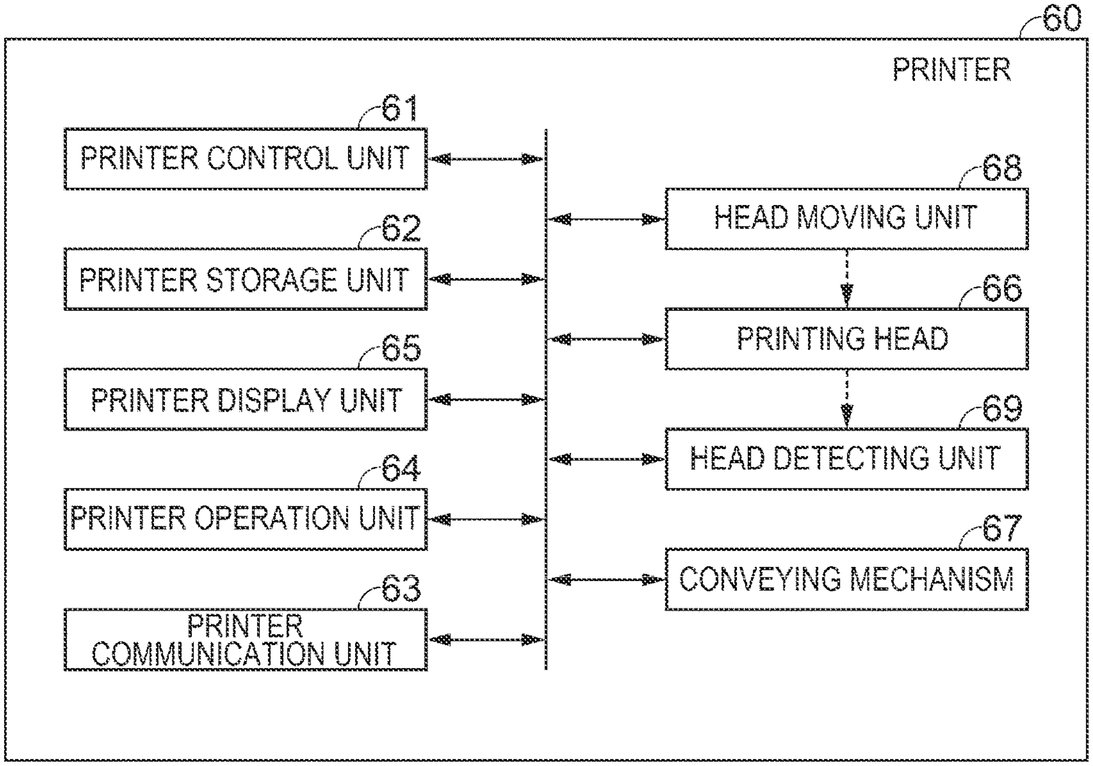
FIG. 2 is a block diagram showing an internal configuration of a printer.

FIG. 2 is a block diagram showing an internal configuration of the printer 60.

As shown in FIG. 2, the printer 60 includes a printer control unit 61, a printer storage unit 62, a printer communication unit 63, a printer operation unit 64, a printer display unit 65, the printing head 66 functioning as a head, a conveying mechanism 67, a head moving unit 68, and a head detecting unit 69. In this embodiment, the printer 60 is an image forming apparatus of an inkjet type that ejects ink, which is liquid, from the printing head 66 to thereby form, that is, print an image. That is, the printing head 66 is an inkjet head.

The printer control unit 61 includes a CPU (Central Processing Unit) and the like and operates according to a not-shown program stored in the printer storage unit 62 to thereby control an operation of the printer 60.

The printer storage unit 62 is configured by a storage device such as a memory and stores, in addition to the program described above, various setting data, printer IDs that are identification information for identifying respective printers 60, and the like. The printer IDs are equivalent to apparatus identification information.

The printer communication unit 63 includes various interface circuits for performing communication with external apparatuses. The printer communication unit 63 in this embodiment includes an interface circuit for performing communication via the network NW.

The printer operation unit 64 is configured by an operation button and the like and receives input operation performed by the user and transmits the input operation to the printer control unit 61. The printer display unit 65 is configured by a liquid crystal display, an organic EL (Electro Luminescence) display, an LED (Light Emitting Diode), or the like and displays, for example, information based on control of the printer control unit 61. The printer operation unit 64 may be integral with the printer display unit 65 like a touch panel.

In the printing head 66, a plurality of nozzles for ejecting ink are formed. The printing head 66 ejects, based on the control of the printer control unit 61, ink supplied from a not-shown ink tank to a not-shown printing medium.

The conveying mechanism 67 conveys, based on the control of the printer control unit 61, a printing medium set in the printer 60 in a predetermined conveyance direction such that the printing medium passes a position where the ink is ejected by the printing head 66. The head moving unit 68 causes, based on the control of the printer control unit 61, the printing head 66 to reciprocate in a main scanning direction crossing the conveyance direction.

The printer control unit 61 performs main scanning for ejecting the ink from the nozzles of the printing head 66 while moving the printing head 66 in the main scanning direction to form, on the printing medium, a raster line in which dots are arranged in the main scanning direction. The printer control unit 61 can eject the ink to a wide range of the printing medium by alternately performing the main scanning and sub-scanning for moving the printing medium in the conveyance direction. The printer control unit 61 controls, based on printing data supplied from the user terminal 50, not-shown another computer, or the like, the operation explained above to thereby cause the printing head 66 to form an image based on the printing data on the printing medium.

A failure such as clogging of foreign matters in the nozzles can occur in the printing head 66 according to a situation of use of the printer 60. Therefore, the printing head 66 is configured to be replaceable. A person in charge of repair of the sales company or the like or a user who has undergone predetermined education can replace the printing head 66. When the user replaces the printing head 66, it is possible to further reduce expenses and time compared with when the user requests the sales company to replace the printing head 66. The user who has undergone the predetermined education replacing the printing head 66 is hereinafter referred to as "self-repair" as well.

The head detecting unit 69 detects, based on the control of the printer control unit 61, the printing head 66 attached to the printer 60. Specifically, a not-shown nonvolatile memory is attached to the printing head 66. Head IDs, which are identification information for identifying the individual printing heads 66, are written in the respective memories. The head detecting unit 69 is connected to the memory and reads a head ID from the memory to thereby detect the printing head 66. Further, the head detecting unit 69 can detect, based on the read head ID, the replacement of the printing head 66. A QR code (registered trademark), in which the head ID is written, is also attached to the printing head 66. The head ID is equivalent to the head identification information.

Figure 3:
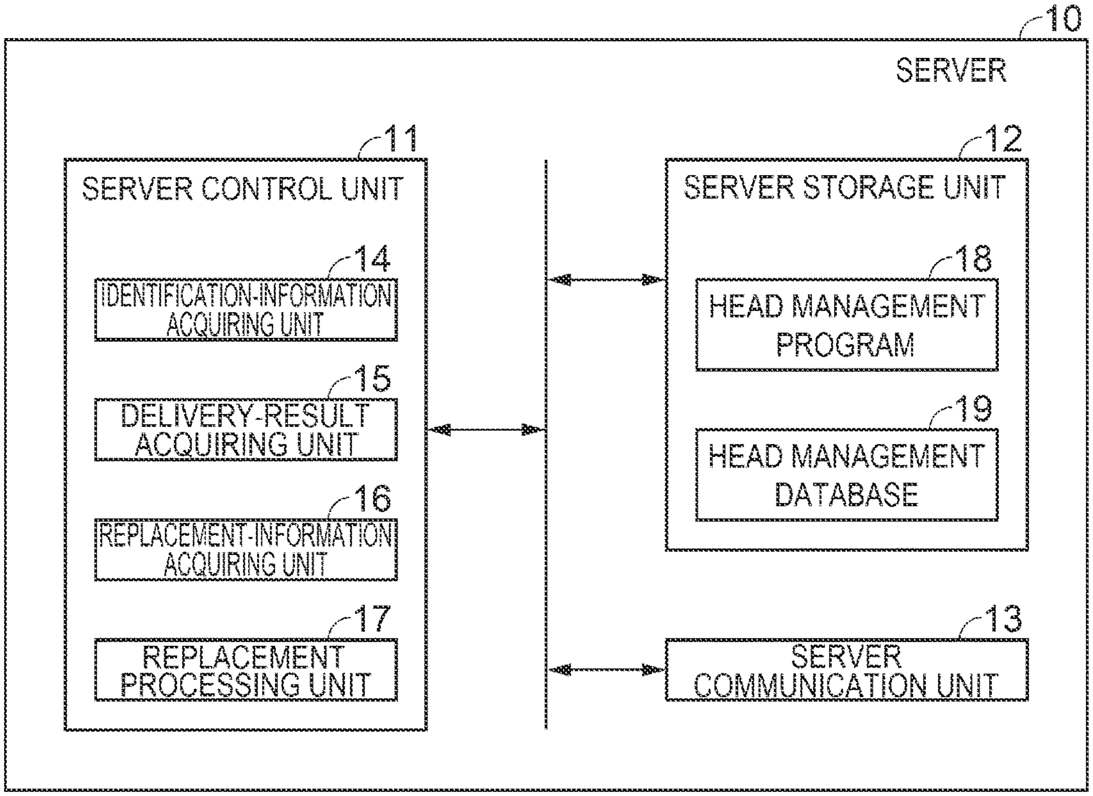
FIG. 3 is a block diagram showing an internal configuration of a server.

FIG. 3 is a block diagram showing an internal configuration of the server 10.

As shown in FIG. 3, the server 10 is configured by, for example, a general-purpose computer and includes a server control unit 11, a server storage unit 12, and a server communication unit 13. The server storage unit 12 and the server communication unit 13 are connected to the server control unit 11 via a bus or the like.

The server control unit 11 includes a CPU and memories such as a RAM (Random Access Memory) and a ROM (Read Only Memory). The server control unit 11 operates according to a not-shown OS (Operating System) and not-shown various application programs stored in the server storage unit 12 to thereby control an operation of the server 10 and execute various operations according to requests from the terminal devices 20 to 50 and the printer 60, which are clients.

The server storage unit 12 is configured by a storage device such as a hard disk drive or an SSD (Solid State Drive) and stores the OS and the various application programs described above and the like. The application programs stored in the server storage unit 12 include a head management program 18 for managing delivery, replacement, and collection of the printing head 66. A head management database 19 is stored in the server storage unit 12 in this embodiment. Various kinds of information concerning the user, the printer 60, and the printing head 66, which is a delivery target, are saved in the head management database 19 in association with one another. A delivery history, a replacement history, a collection history, and the like of the printing head 66 are configured by these kinds of information.

The server communication unit 13 includes various interface circuits for performing communication with the external apparatuses. The server communication unit 13 in this embodiment includes an interface circuit for performing communication via the network NW and can communicate with the terminal devices 20 to 50 and the printer 60 via the network NW.

The server control unit 11 includes an identification-information acquiring unit 14, a delivery-result acquiring unit 15, a replacement-information acquiring unit 16, and a replacement processing unit 17 as functional units implemented by the head management program 18. The identification-information acquiring unit 14 acquires the head ID of the printing head 66 from the terminal devices 20 to 50 and the printer 60 in a process from delivery to the user of the printing head 66 to collection. When the printing head 66 is delivered to the user, the delivery-result acquiring unit 15 acquires, from the person in charge of delivery terminal 40, an address of a delivery distribution to which the printing head 66 has been actually delivered. When the printing head 66 of the printer 60 is replaced, the replacement-information acquiring unit 16 acquires, from the printer 60, replacement information indicating that the printing head 66 has been replaced. The replacement processing unit 17 performs processing corresponding to a delivery result and a replacement result of the printing head 66. Details of the functional units are explained below.

The server control unit 11 operating according to the head management program 18 functions as a WEB server as well and causes, in response to requests from the terminal devices 20 to 50, which are the clients, the terminal devices 20 to 50 to display a predetermined WEB page. Persons in charge and users who operate the terminal devices 20 to 50 can transmit, by accessing the WEB page and inputting various kinds of information, the information to the server 10. The WEB page that the server control unit 11 operating according to the head management program 18 causes the terminal devices 20 to 50 to display is hereinafter referred to as "head management page" as well.

Figure 4:
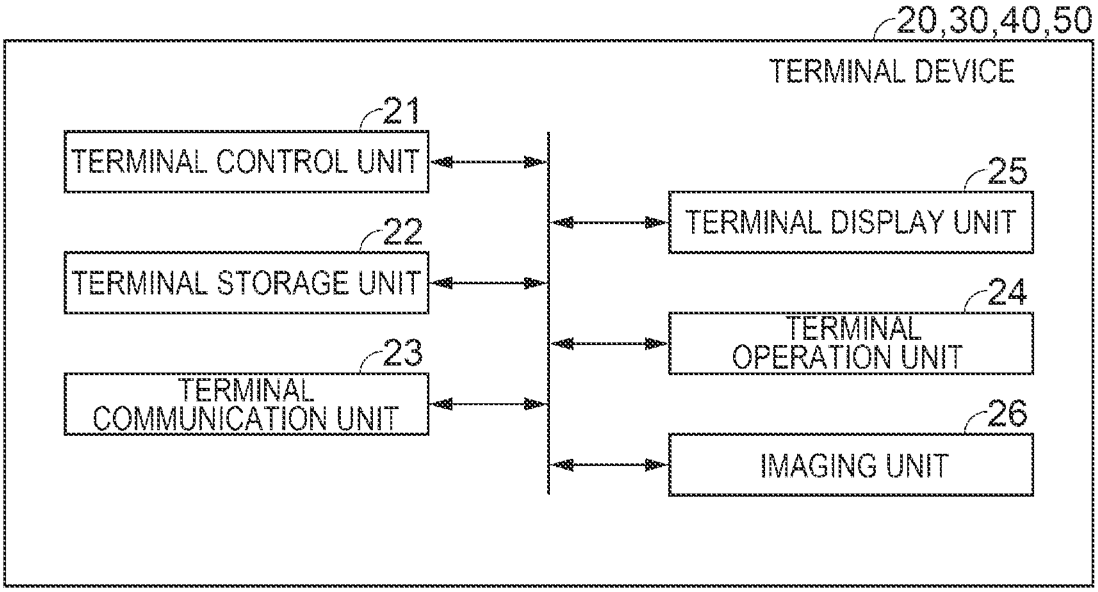
FIG. 4 is a block diagram showing an internal configuration of a terminal device.

FIG. 4 is a block diagram showing an internal configuration of the terminal devices 20 to 50.

As shown in FIG. 4, the terminal devices 20 to 50 are configured by a personal computer, a portable terminal of a tablet type, or the like. The terminal devices 20 to 50 each include a terminal control unit 21, a terminal storage unit 22, a terminal communication unit 23, a terminal operation unit 24, a terminal display unit 25, and an imaging unit 26.

The terminal control unit 21 includes a CPU and memories such as a RAM and a ROM and operates according to a not-shown OS and not-shown various application programs stored in the terminal storage unit 22 to thereby control operations of the terminal devices 20 to 50. The terminal storage unit 22 is configured by a hard disk drive, an SSD, or a storage device such as a memory and stores various data and the like in addition to the OS and the various application programs described above. The terminal communication unit 23 includes various interface circuits for performing communication with the external apparatuses. The terminal communication unit 23 in this embodiment includes an interface circuit for performing communication via the network NW.

The terminal operation unit 24 is configured by a keyboard, a pointing device, and the like and receives input operation performed by the persons in charge and the users and transmits the input operation to the terminal control unit 21. The terminal display unit 25 is configured by a liquid crystal display, an organic EL display, or the like and displays an image based on control of the terminal control unit 21. The terminal operation unit 24 may be integral with the terminal display unit 25 like a touch panel. The terminal operation unit 24 and the terminal display unit 25 may be separated from main bodies of the terminal devices 20 to 50 like a desktop computer.

The imaging unit 26 includes a camera and outputs a captured image captured by the camera to the terminal control unit 21. The imaging unit 26 in this embodiment is used for imaging of a QR code. However, the sales company terminal 20 and the user terminal 50 may not include the imaging unit 26.

A program capable of displaying a WEB page supplied from the server 10 such as a WEB browser is installed in the terminal storage unit 22 in this embodiment as an application program. As explained above, the terminal devices 20 to 50 may be a desktop or notebook personal computer or may be a portable terminal. However, since the person in charge of delivery terminal 40 is a terminal device carried during delivery by the person in charge of delivery, the person in charge of delivery terminal 40 is assumed to be a portable terminal. The terminal devices 20 to 50 are not limited to general-purpose equipment and may be equipment dedicated to the head management system 1.

Subsequently, a head management method by the head management system 1 is explained.

Figure 5A:
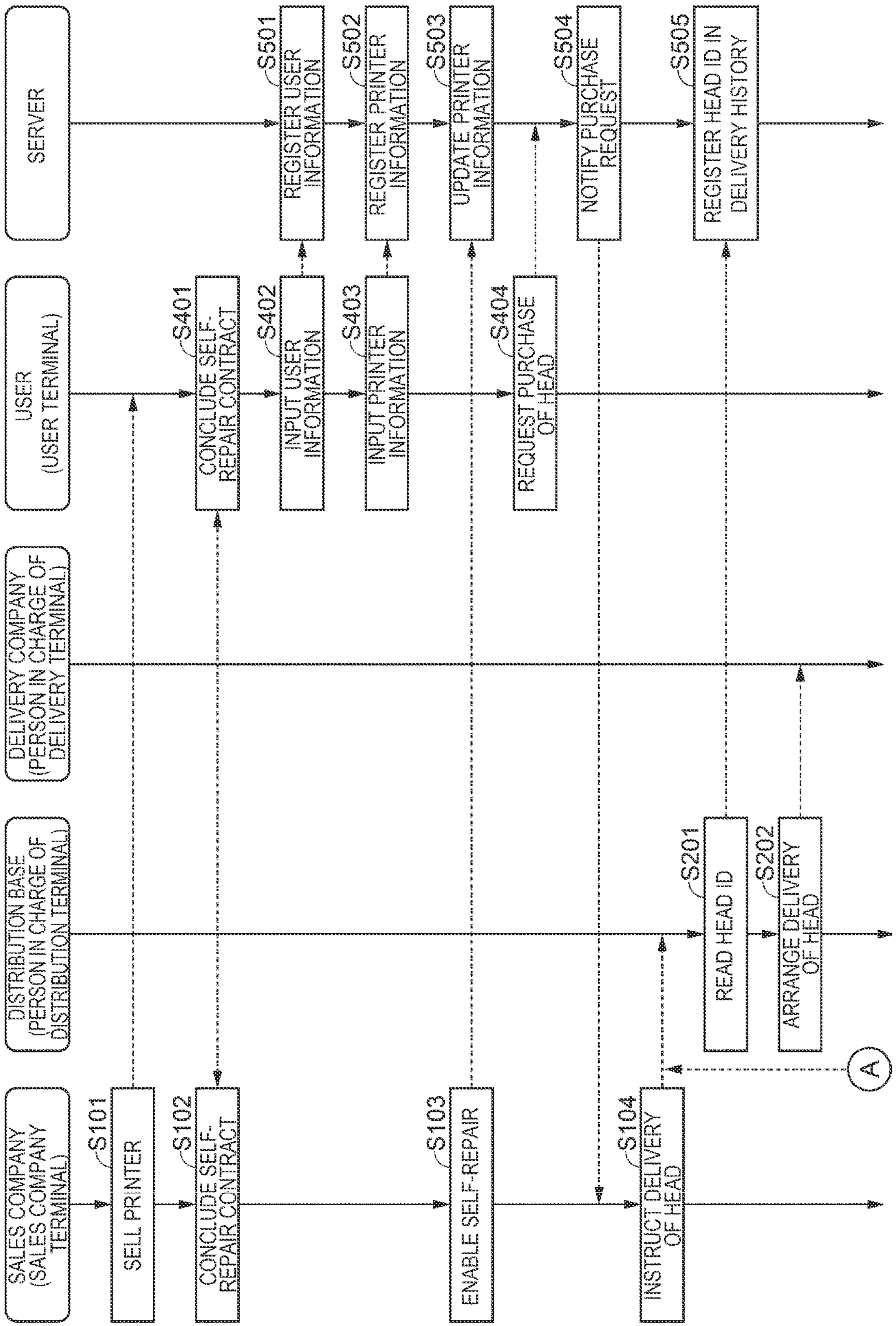
FIG. 5A is a flowchart showing a head management method.
Figure 5B:
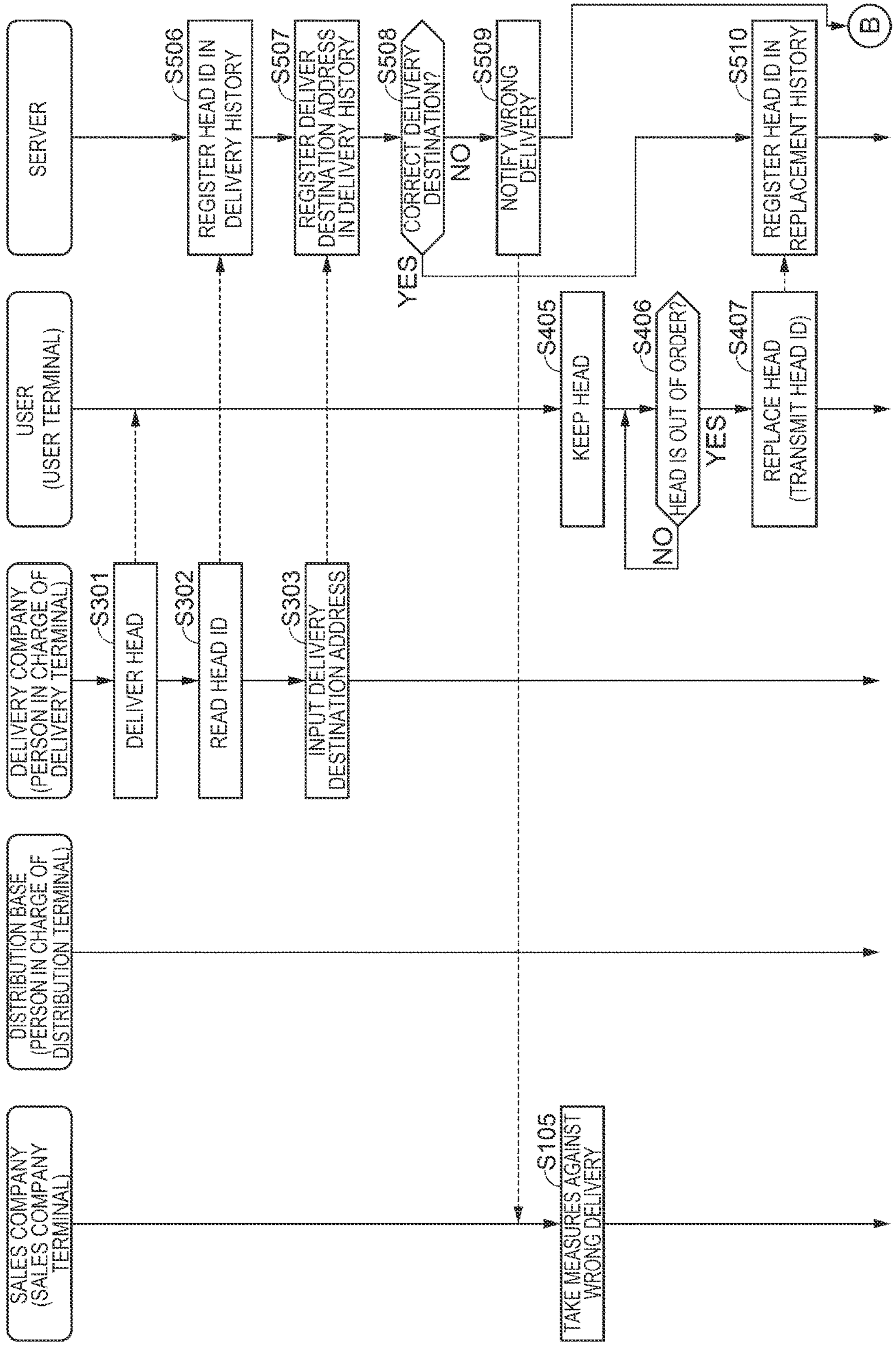
FIG. 5B is a flowchart showing the head management method.
Figure 5C:
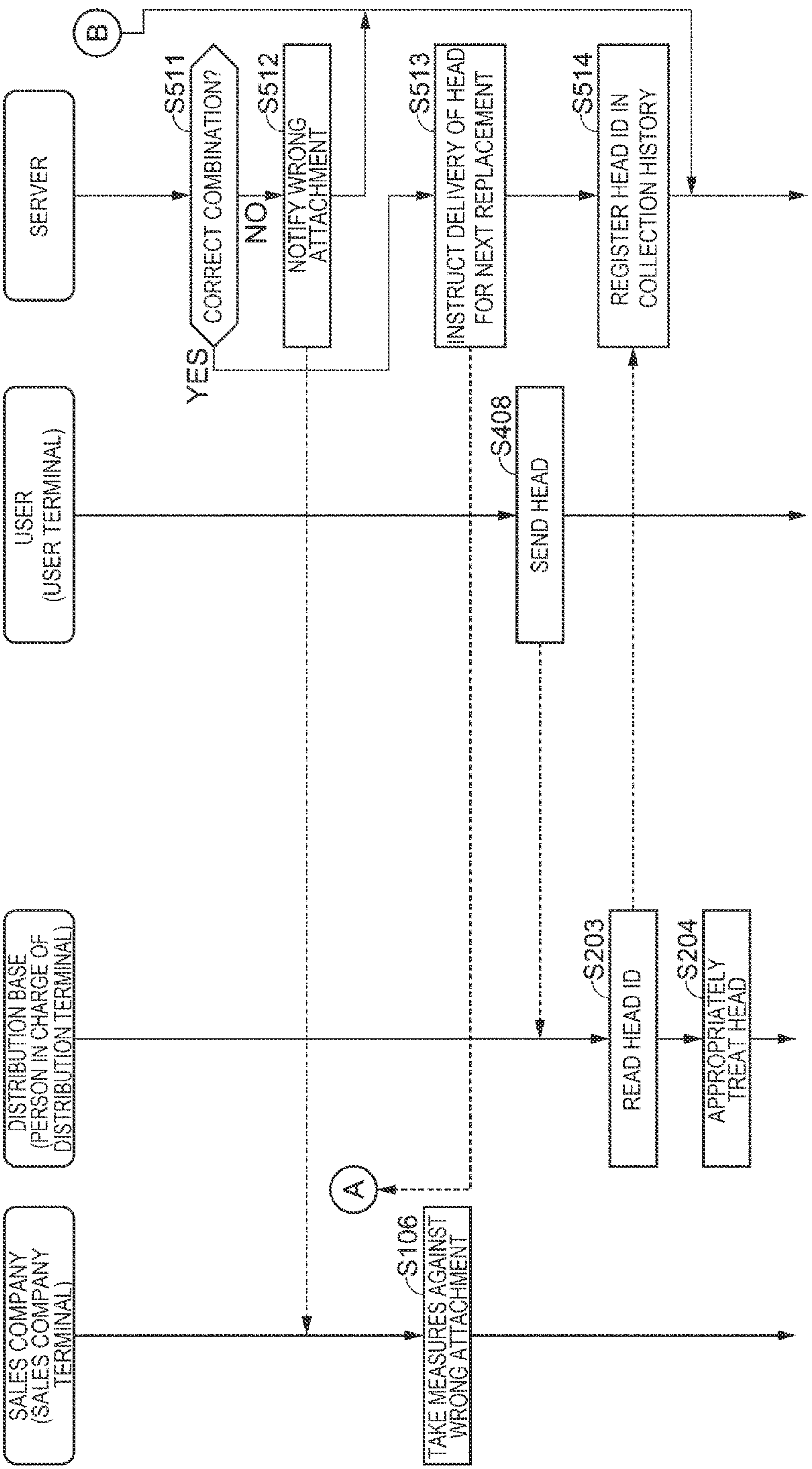
FIG. 5C is a flowchart showing the head management method.

FIGS. 5A, 5B, and 5C are flowcharts showing the head management method. The flowcharts include steps S101 to S106 indicating operations of the person in charge of sales of the sales company, steps S201 to S204 indicating operations of the person in charge of distribution of the distribution base, steps S301 to S303 indicating operations of the person in charge of delivery of the delivery company, steps S401 to S408 indicating operations of the user, and steps S501 to S514 indicating operations of the server 10.

As shown in FIGS. 5A to 5C, the person in charge of sales of the sales company sells the printer 60 to the user (step S101) and concludes a self-repair maintenance contract with the user (steps S102 and S401). The maintenance contract is a contract for, concerning replacement of the printing head 66, agreeing that the user who has undergone the predetermined education carries out the replacement.

After installing the printer 60 and connecting the printer 60 to the network NW, the user accesses the head management page from the user terminal 50 and carries out input of user information (step S402) and input of printer information (step S403). The user information includes a name of the user or a name of an organization to which the user belongs and an address and a mail address of a delivery destination to which the printing head 66 for replacement should be delivered. The printer information includes a model name and a printer ID of the printer 60. These kinds of information input by the user terminal 50 are transmitted to the server 10. The server control unit 11 acquires the input user information and registers the user information in the head management database 19 (step S501) and acquires the input printer information and registers the printer information in the head management database 19 in association with the user information (step S502).

Thereafter, the person in charge of sales accesses the head management page from the sales company terminal 20 and performs operation for enabling self-repair of the registered printer 60 (step S103). The server control unit 11 receives the operation, adds information indicating that the self-repair is enabled to the printer information and updates the printer information (step S503).

When the self-repair is enabled, the user is capable of purchasing the printing head 66 for replacement. The user accesses the head management page from the user terminal 50 and requests purchase of the printing head 66 for replacement (step S404). It is desirable that the purchase is performed not after a failure of the printing head 66 but before the failure. Therefore, the printing head 66 for first replacement may be delivered after the self-repair contract conclusion without waiting for a purchase request from the user.

When receiving the purchase request from the user, the server control unit 11 notifies the sales company terminal 20 that the purchase request is received (step S504). When receiving the notification, the person in charge of sales instructs, from the sales company terminal 20, the person in charge of distribution terminal 30 to deliver the printing head 66 to the user (step S104).

The person in charge of distribution receives the instruction and selects one printing head 66 to be delivered out of the stocks of the printing heads 66. In the delivery base, the printing heads 66 are stored in individual packing boxes. The same QR codes as QR codes attached to the printing heads 66, that is, QR codes in which head IDs of the stored printing heads 66 are written are attached to the surfaces of the individual packing boxes. When the person in charge of distribution images, with the imaging unit 26 of the person in charge of distribution terminal 30, a QR code attached to an individual packing box of the selected printing head 66 in a state in which the person in charge of distribution accesses the head management page from the person in charge of distribution terminal 30, the person in charge of distribution terminal 30 reads a head ID from a captured image of the QR code and transmits the head ID to the server 10 (step S201).

The identification-information acquiring unit 14 of the server 10 acquires the transmitted head ID and registers the head ID in the delivery history of the head management database 19 in association with the user information of the user who has requested the purchase (step S505). The acquisition and the registration of the head ID are performed before the printing head 66 is delivered. The head ID registered in step S505 can be referred to later as a history of the instruction of the delivery. In the head management database 19, since the user information includes the address of the delivery destination, an address of a delivery destination to which the printing head 66 should be delivered is associated with the head ID registered in the delivery history. Since the printer information is associated with the user information, a printer ID included in the printer information corresponding to the user information is associated with the head ID registered in the delivery history. That is, the printer 60 to which the printing head 66 to be delivered should be attached is determined by the registration. In other words, a combination of the printing head 66 and the printer 60 is determined. Thereafter, the person in charge of distribution makes arrangements for delivery of the printing head 66 with the delivery company (step S202).

The person in charge of delivery receives, from the distribution base, the printing head 66 to be delivered and delivers the printing head 66 to the delivery destination (step S301). After the printing head 66 arrives at the delivery destination, before sending the printing head 66 to the user, the person in charge of delivery images, with the imaging unit 26 of the person in charge of delivery terminal 40, the QR code of the individual packing box of the printing head 66 in a state in which the person in charge of delivery accesses the head management page from the person in charge of delivery terminal 40. When the imaging is performed, the person in charge of delivery terminal 40 reads the head ID from a captured image of the QR code and transmits the head ID to the server 10 (step S302). The identification-information acquiring unit 14 of the server 10 acquires the transmitted head ID and registers the head ID in the delivery history of the head management database 19 in association with the user information of the user who has requested the purchase (step S506).

Further, in a state in which the person in charge of delivery accesses the head management page from the person in charge of delivery terminal 40, the person in charge of delivery inputs the address of the delivery destination as information concerning the delivery destination to which the printing head 66 has been actually delivered (step S303). The delivery-result acquiring unit 15 of the server 10 acquires the input address of the delivery destination and registers the address of the delivery destination in the delivery history of the head management database 19 in association with the user information of the user who has requested the purchase (step S507). The head ID and the address of the delivery destination registered in steps S506 and S507 can be referred to later as a history of completion of the delivery.

Thereafter, the server control unit 11 determines, based on the delivery history, whether the printing head 66 has been delivered to a correct delivery destination (step S508). Specifically, the server control unit 11 determines whether the address of the delivery destination input by the person in charge of delivery, that is, the address of the delivery destination acquired by the delivery-result acquiring unit 15 and the address of the delivery destination included in the user information, that is, the address of the delivery destination associated with the head ID of the delivered printing head 66 coincide. When the addresses of the delivery destinations do not coincide (NO in step S508), the replacement processing unit 17 of the server 10 notifies the sales company terminal 20 that a mistake of a delivery destination, that is, wrong delivery has occurred (step S509). When receiving the notification, the person in charge of sales takes measures against the wrong delivery, for example, makes contact with the person in charge of distribution or the person in charge of delivery and causes the person in charge of distribution or the person in charge of delivery to deliver the printing head 66 again (step S105). On the other hand, when the printing head 66 is delivered to a correct delivery destination (YES in step S508), the server control unit 11 executes processing in step S510 and subsequent steps.

When the printing head 66 is delivered, the user keeps the delivered printing head 66 until the printing head 66 attached to the printer 60 at that point in time breaks down (step S405). The user determines, based on a printing result and the like, whether the printing head 66 is out of order while using the printer 60 everyday (step S406). When there is no problem in the printing result and the like and the printing head 66 is not out of order (NO in step S406), the user continues to use the printer 60 and repeats the determination of presence or absence of a failure. On the other hand, when determining that a failure has occurred in the printing head 66 (YES in step S406), the user replaces the broken printing head 66 with the delivered printing head 66 for replacement (step S407).

When replacing the printing head 66, the user detaches the broken printing head 66 from the printer 60 in a state in which the printer 60 is turned off and attaches the delivered and kept printing head 66 to the printer 60 anew. Thereafter, when the printer 60 is turned on, the printer 60 resumes the operation. First, the head detecting unit 69 reads a head ID from a memory of the printing head 66 attached anew. The printer 60 transmits the read head ID to the server 10 together with the printer ID of the printer 60. The head ID and the printer ID transmitted by the printer 60 are equivalent to the replacement information indicating that the printing head 66 has been replaced. That is, the replacement information includes the head ID of the attached printing head 66 and the printer ID of the printer 60 in which the printing head 66 has been replaced.

The replacement-information acquiring unit 16 of the server 10 acquires the head ID and the printer ID transmitted as the replacement information and registers the head ID and the printer ID in the replacement history of the head management database 19 (step S510). Specifically, the replacement-information acquiring unit 16 registers the acquired head IDs, that is, the head ID of the printing head 66 attached anew and the head ID of the printing head 66 attached before the replacement in the replacement history in association with the acquired printer ID.

Thereafter, the server control unit 11 determines, based on the transmitted head ID and the transmitted printer ID, whether a combination of the printing head 66 and the printer 60 is correct (step S511). When the combination is incorrect (NO in step S511), that is, when the head ID and the printer ID transmitted as the replacement information do not correspond, the replacement processing unit 17 of the server 10 notifies the sales company terminal 20 that a mistake of the combination of the printing head 66 and the printer 60, that is, wrong attachment has occurred (step S512). When receiving the notification, the person in charge of sales takes measures against the wrong attachment, for example, makes contact with the user (step S106). The replacement processing unit 17 may notify the occurrence of the wrong attachment to the user terminal 50 or the printer 60 in addition to the sales company terminal 20. In this case, it is possible to cause the user to quickly recognize that the wrong attachment has occurred. On the other hand, when the combination of the printing head 66 and the printer 60 is correct (YES in step S511), the server control unit 11 executes processing in step S513 and subsequent steps.

In the above explanation, "when the head ID and the printer ID do not correspond" includes, in addition to a case in which the printing head 66 associated with a different printer 60 is attached, for example, a case in which the head ID included in the replacement information is not registered in the delivery history and a case in which the head ID cannot be read from the attached printing head 66.

Subsequently, the replacement processing unit 17 of the server 10 instructs the person in charge of distribution terminal 30 to deliver a new printing head 66 that can be attached to the printer 60 (step S513). The printing head 66 is the printing head 66 for the next replacement and is attached when the printing head 66 replaced this time is broken down. When the person in charge of distribution terminal 30 receives the instruction for the delivery, the operations in step S201 and subsequent steps explained above are repeated for the printing head 66 that should be delivered anew.

When finishing the replacement of the printing head 66, the user sends the printing head 66 detached by the replacement to the distribution base (step S408). That is, the printing head 66 is collected in the distribution base. When the printing head 66 is collected, in a state in which the person in charge of distribution accesses the head management page from the person in charge of distribution terminal 30, the person in charge of distribution images, with the imaging unit 26 of the person in charge of distribution terminal 30, a QR code attached to the surface of the collected printing head 66. When the QR code is imaged, the person in charge of distribution terminal 30 reads a head ID from a captured image of the QR code and transmits the head ID to the server 10 (step S203). The identification-information acquiring unit 14 of the server 10 acquires the transmitted head ID, that is, the head ID of the collected printing head 66 and registers the head ID in the collection history of the head management database 19 in association with the user information of the user (step S514). Thereafter, the person in charge of distribution performs appropriate treatment such as repair or discarding on the collected printing head 66 (step S204).

As explained above, according to this embodiment, it is possible to obtain the following effects.

(1) According to this embodiment, when the printing head 66 is replaced, the new printing head 66 used for the next replacement is delivered. Therefore, compared with when a procedure for purchase is performed after a failure or the like of the printing head 66 occurs, it is possible to reduce a period in which the printer 60 cannot be used.

(2) According to this embodiment, when the combination of the head ID and the printer ID transmitted after the replacement of the printing head 66 is different from the combination determined before the delivery, the server 10 notifies the sales company terminal 20. Therefore, the person in charge of sales is capable of recognizing that wrong attachment is likely to have occurred.

(3) According to this embodiment, when the delivery destination associated with the printing head 66 before the delivery and the delivery destination to which the printing head 66 has been actually delivered are different, the server 10 notifies the sales company terminal 20. Therefore, the person in charge of sales is capable of recognizing that wrong delivery is likely to have occurred.

In the embodiment explained above, if the printing head 66 attached before the replacement in step S407 is the first head, the printing head 66 after being replaced is equivalent to the second head and the printing head 66 for the next replacement delivered according to the instruction for delivery in step S513 after the replacement is equivalent to the third head. The second head and the third head are considered to have the same configuration as the first head and to be replaceable with the first head. Step S510 for acquiring and registering the head ID transmitted from the printer 60 as the replacement information is equivalent to the acquiring replacement information. Step S513 for instructing delivery of a new printing head 66 after the replacement is equivalent to the instructing delivery of the third head.

The embodiment explained above may be changed as follows.

In the embodiment explained above, after the printing head 66 is replaced and the replacement information is acquired, the replacement processing unit 17 of the server 10 instructs the delivery of the printing head 66 for the next replacement. However, timing for instructing the delivery is not limited to timing immediately after the replacement information is acquired. For example, the replacement processing unit 17 may instruct the delivery after a predetermined period elapses after the replacement information is acquired. The predetermined period may be, for example, several days or may be, for example, several weeks.

In the embodiment explained above, the notification and the instruction performed by the replacement processing unit 17 of the server 10 may be performed via a WEB page or may be performed using other means such as an electronic mail.

In the embodiment explained above, the three organizations of the sales company, the distribution base, and the delivery company are involved in the delivery of the printing head 66. However, the delivery of the printing head 66 is not limited to this form. For example, one organization may perform the functions of two or three organizations among the three organizations. In this case, two or three among the sales company terminal 20, the person in charge of distribution terminal 30, and the person in charge of delivery terminal 40 may be the same. Another organization such as an agency may perform a part of the functions of the three organizations.

In the embodiment explained above, the user information includes the address of the delivery destination as the information concerning the delivery destination and the delivery-result acquiring unit 15 of the server 10 acquires the address of the delivery destination input by the person in charge of delivery as the information concerning the delivery destination. However, the information concerning the delivery destination only has to be information that can specify the delivery destination and is not limited to the address. For example, if the delivery destination is an organization such as a company, the information concerning the delivery destination may be a name of the organization or position information represented by latitude and longitude or the like.

In the embodiment explained above, the delivery of the replaceable printing head 66 is explained. However, the embodiment can also be applied to delivery of components other than the printing head 66, for example, a cap for protecting the printing head 66 when not in use and a filter disposed in a channel of ink.

In the embodiment explained above, one printer 60 is connected to the head management system 1. However, a plurality of printers 60 may be connected to the head management system 1. The plurality of printers 60 may be managed by the same user or may be managed by different users.

In the embodiment explained above, the printer 60 may be an apparatus that prints an image on a printing medium and may be a serial printer, a lateral printer, a line printer, a page printer, or the like. A printing type is not limited to the inkjet type and may be a thermal type, a dot impact type, a laser type, or the like. That is, the printing head 66 is not limited to the inkjet head and may be a head of another type such as a thermal print head. The printer 60 only has to have at least a printing function for printing on a printing medium and may be a multifunction peripheral also having functions other than the printing function. Further, the printer 60 may be an apparatus that prints on not only a two-dimensional medium but also a medium having a three-dimensional curved surface.

What is claimed is:

1. An information processing apparatus that is connected to an image forming apparatus and manages delivery of a second head replaceable with a first head attached to the image forming apparatus, the information processing apparatus comprising:

a replacement-information acquiring unit configured to acquire, from the image forming apparatus, replacement information indicating that the first head was replaced with the second head; and a replacement processor configured to instruct the delivery of a third head when the replacement-information acquiring unit acquires the replacement information, wherein the image forming apparatus comprises:

a head detecting unit configured to read head identification information from a memory of the second head, which replaces the first head and is attached to the image forming apparatus; and a memory configured to store identification information of the image forming apparatus, wherein the image forming apparatus transmits the head identification information and the identification information of the image forming apparatus to the information processing apparatus, after replacement of the first head with the second head, wherein the replacement information includes the head identification information of the second head and the identification information of the image forming apparatus, and wherein the replacement processor instructs the delivery of the third head when the head identification information corresponds to the identification information of the image forming apparatus.

2. The information processing apparatus according to claim 1, further comprising an identification-information acquiring unit configured to acquire, before the second head is delivered, head identification information for identifying the second head, wherein the identification information of the image forming apparatus to which the second head should be attached is associated with, before the second head is delivered, the head identification information acquired by the identification-information acquiring unit, and the replacement processor performs notification when the identification information of the image forming apparatus included in the replacement information and the head identification information included in the replacement information do not correspond.

3. The information processing apparatus according to claim 1, further comprising:

an identification-information acquiring unit configured to acquire, before the second head is delivered, head identification information for identifying the second head; and a delivery-result acquiring unit configured to acquire information concerning a delivery destination to which the second head was actually delivered, wherein information concerning a delivery destination to which the second head should be delivered is associated with, before the second head is delivered, the head identification information acquired by the identification-information acquiring unit, and the replacement processor performs notification when the information concerning the delivery destination acquired by the delivery-result acquiring unit is different from the information concerning the delivery destination associated with the head identification information.

4. The information processing apparatus according to claim 1, wherein the replacement processor instructs the delivery of the third head after a predetermined period elapses after the replacement information is acquired.

5. The information processing apparatus according to claim 1, wherein the first head, the second head, and the third head are inkjet heads that eject liquid.

6. The information processing apparatus according to claim 1, wherein the replacement processor is configured to instruct the delivery of the second head to the image forming apparatus without waiting for a purchase request.

7. A head management method for managing delivery of a second head replaceable with a first head attached to an image forming apparatus, the head management method comprising:

reading, by the image forming apparatus, head identification information from a memory of the second head, which replaces the first head and is attached to the image forming apparatus;

transmitting, by the image forming apparatus, to an information processing apparatus identification information of the image forming apparatus and the head identification information;

acquiring, by the information processing apparatus from the image forming apparatus, replacement information indicating that the first head was replaced with the second head; and instructing, by the information processing apparatus, the delivery of a third head when the replacement information is acquired, wherein the head identification information and the identification information of the image forming apparatus are transmitted to the information processing apparatus, after replacement of the first head with the second head, wherein the replacement information includes the head identification information of the second head and the identification information of the image forming apparatus, and wherein the replacement processor instructs the delivery of the third head when the head identification information corresponds to the identification information of the image forming apparatus.

8. A head management system comprising:

an image forming apparatus comprising a head detecting unit configured to read head identification information from a memory of a second head, which replaces a first head and is attached to the image forming apparatus; and a memory configured to store identification information of the image forming apparatus; and an information processing apparatus that is connected to the image forming apparatus and manages delivery of the second head replaceable with the first head attached to the image forming apparatus, the information processing apparatus including:

a replacement-information acquiring unit configured to acquire, from the image forming apparatus, replacement information indicating that the first head was replaced with the second head; and a replacement processor configured to instruct the delivery of a third head when the replacement-information acquiring unit acquires the replacement information, wherein the image forming apparatus transmits the head identification information and the identification information of the image forming apparatus to the information processing apparatus, after replacement of the first head with the second head, wherein the replacement information includes the head identification information of the second head and the identification information of the image forming apparatus, and wherein the replacement processor instructs the delivery of the third head when the head identification information corresponds to the identification information of the image forming apparatus.

* * * * *